United States Patent [19]

Scharf, Sr.

[11] 4,268,992
[45] May 26, 1981

[54] TREE PROTECTOR

[76] Inventor: Raymond J. Scharf, Sr., Rte. 5, Box 41D, Poplar Bluff, Mo. 63901

[21] Appl. No.: 24,563

[22] Filed: Mar. 28, 1979

[51] Int. Cl.³ .......................................... A01G 13/10
[52] U.S. Cl. .................................. 47/23; 47/25; 47/30; 47/32; 47/48.5
[58] Field of Search ................................. 47/23–25, 47/32, 48.5, 28, 30, 33

[56] References Cited

U.S. PATENT DOCUMENTS

| 280,637 | 7/1883 | Lensing | 47/23 |
|---|---|---|---|
| 313,424 | 3/1885 | Hughes | 47/25 |
| 1,282,677 | 10/1918 | Comstock | 47/23 X |
| 1,931,602 | 10/1933 | Colman | 47/25 |
| 2,978,837 | 4/1961 | Daniels | 47/25 |
| 3,005,287 | 10/1961 | Dudley | 47/25 |
| 3,287,851 | 11/1966 | Cramer | 47/25 |
| 3,571,972 | 3/1971 | Carter, Jr. | 47/32 X |
| 3,704,004 | 11/1972 | Carter, Jr. | 47/32 X |
| 3,816,959 | 6/1974 | Nalle, Jr. | 47/23 |
| 3,857,195 | 12/1974 | Johnson | 47/32 |
| 3,896,586 | 7/1975 | Caldwell | 47/28 R |

FOREIGN PATENT DOCUMENTS

| 783798 | 7/1935 | France | 47/25 |
|---|---|---|---|
| 2356361 | 3/1978 | France | 47/23 |

Primary Examiner—Steven A. Bratlie
Attorney, Agent, or Firm—Cohn, Powell & Hind

[57] ABSTRACT

This tree protector includes a hollow vertical shaft and an annular base disposed about the shaft, both components being formed from connectible half sections. Hollow, hold-down spikes are provided for watering the tree. The base is provided with an annular trough and an inclined outer periphery, and the hold-down spikes are located within the trough to receive and dispense the watering medium into the adjacent ground.

1 Claim, 7 Drawing Figures

TREE PROTECTOR

BACKGROUND OF THE INVENTION

This invention relates generally to tree protectors and particularly to a tree protector which provides a built-in watering system.

Devices intended to protect the trunks of young trees, in particular, from vermin and other pests are not in themselves new. Early devices of this kind are known, which are formed from clay pipe half sections which are either not held together at all or are held together by a metal band. None of these known devices includes any watering system.

Later devices have utilized metal or plastic mesh cylinders. Devices of this kind suffer from the general disadvantage of being insufficiently rigid, relatively accessible to small animals and difficult to work around with lawn mowers. One such device is formed from a one-piece cylindrical extrusion and can therefore only be used with seedlings or small trees having virtually no spread. This particular device, disclosed in U.S. Pat. No. 3,816,959 does provide a watering stake. However, the stake is bonded to the mesh cylinder and suffers from the additional disadvantage of having a hold-down capability which is limited to the diameter of the mesh cylinder. In addition other disadvantages of this device are that watering access to the stake is limited and the driving of the stake is conditioned by the attachment to the mesh.

The present tree protector overcomes the disadvantages discussed above in a manner not disclosed in the known prior art.

SUMMARY OF THE INVENTION

This tree protector is particularly useful in providing protection for the trunks of young trees and also provides a built-in watering system which includes hollow hold-down spikes which insure adequate stability for the protector as well as insuring adequate water dispensing.

The protector includes a vertical hollow shaft formed from a pair of connectible half sections; an annular, ground engaging base disposed about said shaft and formed from a pair of connectible half sections, and a pair of hollow hold-down spikes engageable with the base in spaced relation from the shaft and having upper end openings for receiving watering liquid, a pointed lower end for driving the spike into the ground, and means for dispensing the liquid into adjacent ground.

One aspect of the invention is that each spike includes a flanged upper end portion and the base includes a pair of spike-receiving openings having margin portions engageable by said flanged upper end portions.

Another aspect of the invention is that the base includes an annular trough and the spike-receiving openings are disposed within the trough so that watering liquid is delivered to the open ends of the spike.

Yet another aspect of the invention is that the base includes an annular, inclined portion providing a generally conical surface adjacent the ground.

A further aspect of the invention is that the shaft half sections and the base half sections are separately formed, the base including an upstanding center portion, overlappingly engageable with the lower portion of the shaft to restrict lateral movement between said shaft and said base.

Still another aspect of the invention is that the shaft half sections, and the base half sections, are substantially identically formed, each half section including an upset, overlapping margin and an oppositely disposed cooperating margin connectable thereto by fasteners.

Another aspect of the invention is that the hold-down spikes include a pointed closed lower end for driving the spike into the ground and a plurality of side openings disposed between the upper and lower ends for dispensing watering liquid into the adjacent ground.

DESCRIPTION OF THE PREFERRED EMBODIMENT

Figure 1:
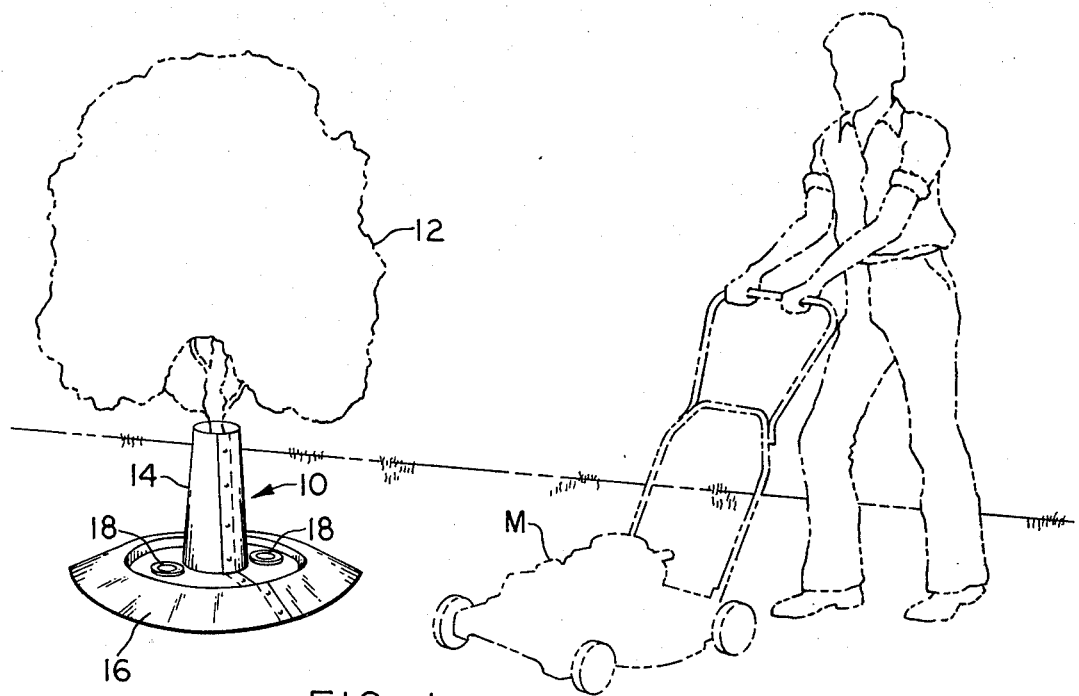
FIG. 1 is a perspective view of the tree protector device in use.

Referring now by reference numerals to the drawings and first to FIG. 1 it will be understood that the tree protector indicated by numeral 10 is intended for the protection of young trees or shrubs such as that generally indicated by numeral 12. The protector includes essentially a vertical hollow shaft 14; a base 16, and a pair of hold-down spikes 18. The protector shaft 14 is intended to protect the trunk of the tree 12 against small animals and the base 16 permits efficient mowing by the lawnmower indicated by M.

Figure 2:
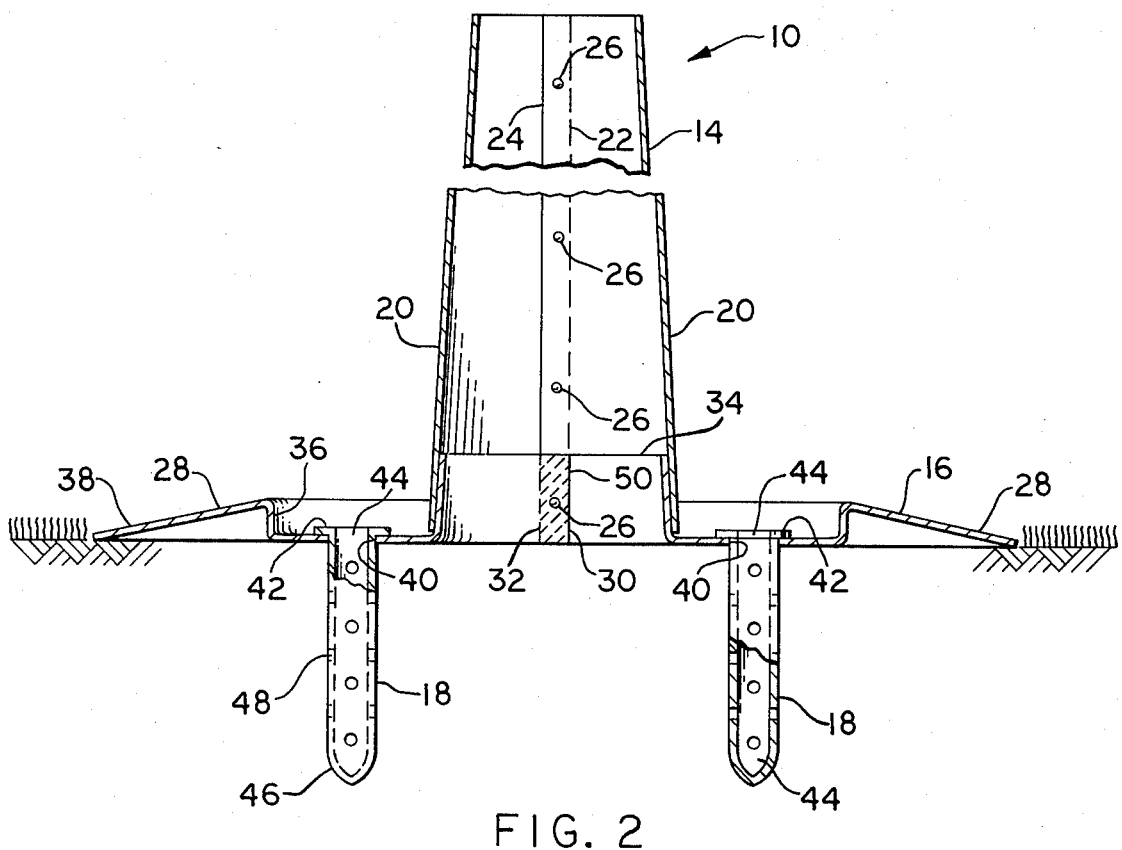
FIG. 2 is an enlarged longitudinal cross sectional view of the device.
Figure 3:
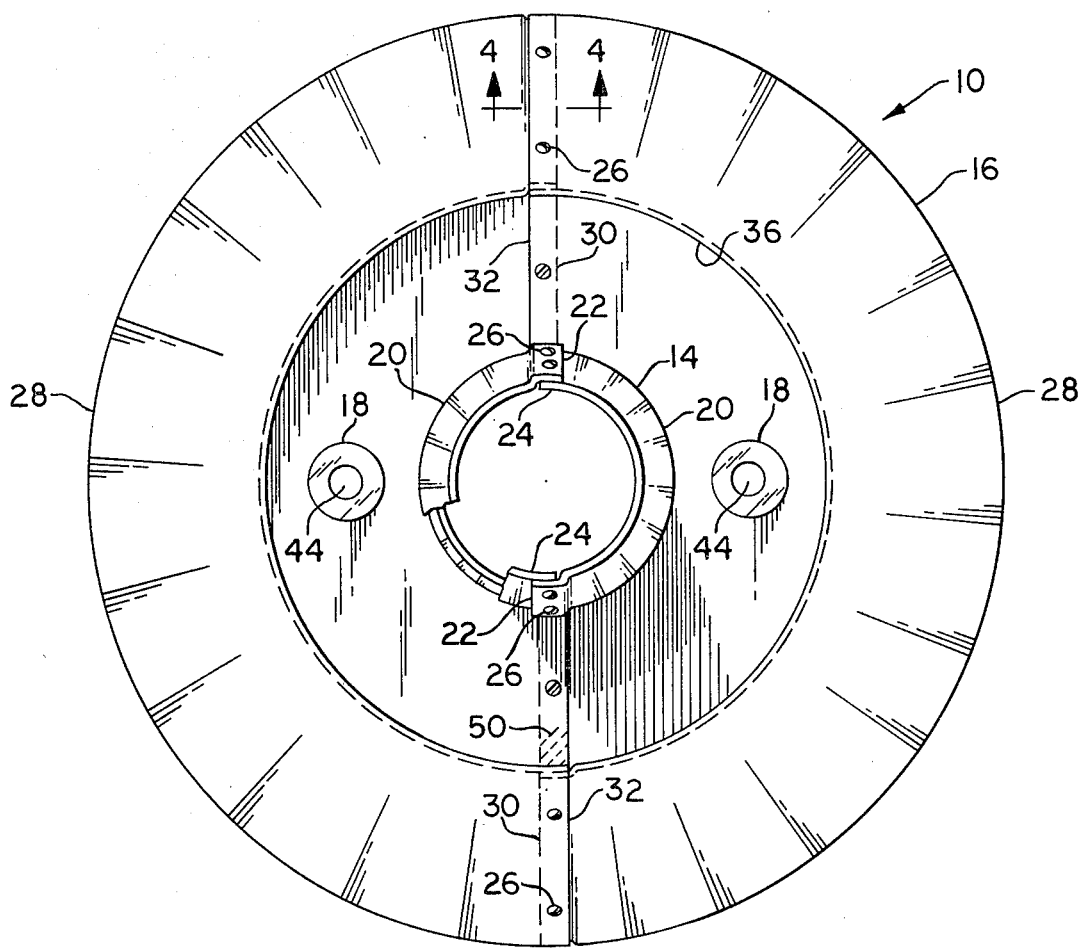
FIG. 3 is a plan view of the device.
Figure 4:
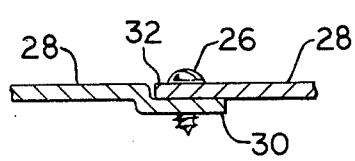
FIG. 4 is an enlarged detail in cross section, taken on line 4—4 of FIG. 3 illustrating a typical fastener connection.

More particularly, and referring to FIGS. 2 and 3 it will be understood that in the embodiment shown, the shaft 14 and the base 16 are separate members each consisting of connected half-round sections 20, 28. The shaft 14 is formed from a pair of half-round sections which are substantially identical, each including an upset longitudinal margin 22, and an oppositely disposed longitudinal margin 24, said margins 22 and 24 of opposite sections being overlappingly related and being apertured for connection by fasteners 26 of the type shown in FIG. 4. As clearly shown in FIG. 2 the shaft 14 is generally frusto-conical in configuration in its connected condition.

The base 16 is annular in configuration and is disposed about said hollow shaft 14. The base 16, like the shaft 14, is formed from a pair of substantially identical half sections each having an upset margin 30 and an oppositely disposed longitudinal margin 32 said margins 30 and 32 of opposite sections being overlappingly related and apertured for connection as by fasteners 26. As will be observed from FIG. 3, the upset margins of the shaft and base are disposed on the outer face and inner face respectively to facilitate assembly of the two components. Where necessary for purposes of insuring liquid retention within the trough 36, a gasket 50, see FIG. 2, can be provided between the overlapping margins 30 and 32 to seal the trough joint.

In the embodiment shown in FIGS. 2 and 3, the base 16 includes a generally conical hub 34, which is compatibly conically configured to receive the shaft 14 to preclude lateral movement between the two components. An annular trough 36 is disposed adjacent the hub 34 and an inclined outer portion 38 is disposed adjacent the trough. The hub, trough, and inclined outer portions 34, 36 and 38 are integrally formed with respect to each half section.

The trough 36 is provided with a pair of circumferentially spaced openings 40, which receive the spikes 18 therethrough. As clearly shown in FIG. 2, each spike includes an upper end having a flange 42 which defines an opening 44 for receiving watering liquid such as plant food or rain water either directly or from the trough 36, and to this end, the openings 44 are disposed below the upper portion of the trough sides. Each spike also includes a pointed lower end 46 and a plurality of apertures 48 disposed between said upper and lower ends for dispensing liquid received within said hollow spike 18 into the ground adjacent the spike.

Figure 6:
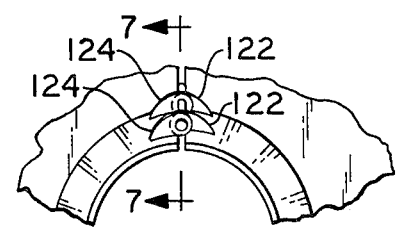
FIG. 6 is a fragmentary plan view illustrating a modified fastener connection.
Figure 5:
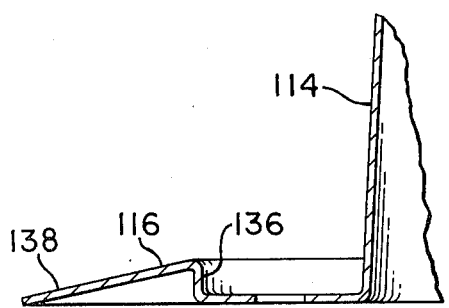
FIG. 5 is a fragmentary, cross sectional elevation illustrating a modified device.
Figure 7:
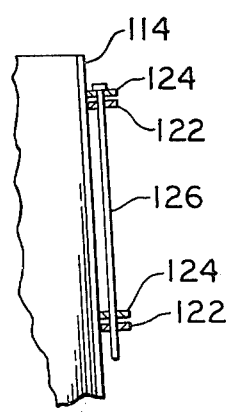
FIG. 7 is a cross sectional view taken on line 7—7 of FIG. 6.

As will be readily understood the provision of separate shaft and base components 12 and 14 facilitates shipping and storage. However, the device is not limited to this structure and FIGS. 5, 6 and 7 disclose details of a modified protector. Essentially, the modified device is identical with the previously described device except that, as shown in FIG. 5, the shaft 114 and the base 116 are integrally formed rather than being separate components. As with the previously described embodiment, the device is formed from substantially identical half sections. The half sections can be formed in the same manner as described above insofar as the connectible margin feature is concerned. Alternatively, both embodiments can be formed as shown in FIGS. 6 and 7 in which, in lieu of overlapping longitudinal margins, overlapping lug members 122 and 124 are provided, integrally formed on each half section. As shown in FIG. 7 lugs 124 are disposed at a slightly higher elevation than lugs 122 and both lugs are apertured to receive a pin 126. In other respects the modified embodiment is the same as the embodiment previously described. That is to say that the shaft 114 is substantially frusto-conical and the base 116 includes a trough 136, and an inclined outer portion 138. The structure of the spikes (not shown) is identical.

Tree protector 10, by virtue of being formed in half sections, is easily connected together about a tree trunk without disturbing the upper foliage thereof. Once the connection of these sections is accomplished it is a simple matter to drive the spikes 18 into the ground using the upper end flanges as a "head". The spikes 18 provide an effective hold-down because they are radially spaced from the longitudinal axis of the device and therefore, once inserted, provide a force couple resistance to pullout. Further, the outer inclined portion 38 of the base 16 not only provides a means whereby the lawnmower M can mow substantially up to said base by permitting the lawnmower wheels to ride upon said inclined portion but also provides that the base is not in contact with the ground at all points. This is an advantage in those instances in which the ground underneath the base is not level. The peripheral engagement of the ground by the rim of the outer portion further adds to the stability of the device by increasing resistance to pullout.

In operation, once the device is placed in position it is of sufficient height to prevent damage of the young tree trunk by small animals such as rabbits. In the preferred embodiment the base is between 14 and 18 inches while the height can vary between 12 and 24 inches. The spikes 18 are 4 to 6 inches long and the height of the trough is preferred at at least $\frac{1}{2}$ inch to ensure that the spike opening 44 is disposed below the level of the watering liquid collected in the trough. The spike dispensing openings 48 are preferably between $\frac{1}{8}$ inch and $\frac{1}{4}$ inch in diameter and the spike itself between $\frac{1}{2}$ inch and 1 inch in bore. It will be understood that if desired pilot holes can be drilled in the ground to assist in driving in the spikes when necessary. Further, if desired the spikes may be directly supplied with liquid plant food. It will of course be understood that the tree protector shaft, base and spikes can be formed from any suitable material such as metal or plastic.

I claim as my invention:

1. A tree protector comprising:
  (a) a vertical, hollow shaft including a pair of substantially identical, half-round overlappingly connectible sections,
  (b) a separate annular ground-engaging base including a pair of substantially identical, half-round, overlappingly connectible sections, said base including an annular trough disposed for use above the ground having substantially vertical inner and outer sides and interfitted with said shaft at said inner side, a pair of circumferentially spaced openings disposed in said trough and said base including an inwardly and upwardly inclined substantially planar peripheral portion adapted to lie above the ground disposed adjacent said trough and having a ground-engaging rim to facilitate use with uneven ground, said inclined peripheral portion extending between said ground-engaging rim and said trough outer side at a relatively small angle of inclination to permit lawn mower wheels to ride thereupon, and
  (c) a pair of hollow, hold-down spikes, each including a flanged upper end defining an opening for receiving liquid, a pointed lower end for driving the spike into the ground, and a plurality of side openings disposed between said upper and lower ends for dispensing liquid into the adjacent ground, said spikes being received by said trough openings and said flanged upper end being engageable with the bottom of the trough and said trough sides being higher than said spike upper end openings whereby liquid in said trough is received within said spike upper end openings.

* * * * *